United States Patent
Morelos

(10) Patent No.: US 12,448,219 B2
(45) Date of Patent: Oct. 21, 2025

(54) ADJUSTABLE BRACKET ASSEMBLY

(71) Applicant: Intelligrated Headquarters, LLC, Charlotte, NC (US)

(72) Inventor: Jesús Anselmo Morelos, Querétaro (MX)

(73) Assignee: Intelligrated Headquarters, LLC, Charlotte, NC (US)

( * ) Notice: Subject to any disclaimer, the term of this patent is extended or adjusted under 35 U.S.C. 154(b) by 17 days.

(21) Appl. No.: 18/371,042

(22) Filed: Sep. 21, 2023

(65) Prior Publication Data

US 2025/0100810 A1  Mar. 27, 2025

(51) Int. Cl.
*B65G 41/00* (2006.01)
*F16M 13/02* (2006.01)

(52) U.S. Cl.
CPC ........... *B65G 41/002* (2013.01); *F16M 13/02* (2013.01)

(58) Field of Classification Search
CPC ...... B65G 41/002; B65G 41/00; B65G 41/02; F16M 13/02
USPC ............. 248/274.1, 126, 122.1, 125.9, 276.1
See application file for complete search history.

(56) References Cited

U.S. PATENT DOCUMENTS

| | | | | |
|---|---|---|---|---|
| 1,812,429 A * | 6/1931 | Bruno | ...................... | A47H 1/13 248/256 |
| 3,942,626 A * | 3/1976 | Wilding | ............... | B65G 39/125 198/826 |
| 4,826,122 A * | 5/1989 | Cupp | ...................... | E04G 3/265 248/237 |
| 5,193,663 A * | 3/1993 | Kuroda | .................. | B65G 39/12 198/819 |
| 5,655,647 A * | 8/1997 | Wheeler | ................ | B65G 21/00 198/861.5 |
| 6,296,109 B1 * | 10/2001 | Nohl | ...................... | B65G 21/14 198/632 |
| 7,012,675 B1 * | 3/2006 | Zhang | .................... | G03B 27/62 355/75 |
| 7,455,173 B1 * | 11/2008 | Fridman | ................ | B65G 21/14 198/313 |
| 7,883,065 B2 * | 2/2011 | Nelson | ............... | F16M 11/2021 248/70 |

(Continued)

FOREIGN PATENT DOCUMENTS

CN  201258194 Y  6/2009
CN  213230244 U  5/2021

*Primary Examiner* — Nkeisha Smith
(74) *Attorney, Agent, or Firm* — Alston & Bird LLP

(57) ABSTRACT

The present disclosure provides an adjustable bracket assembly for a conveyor system. The adjustable bracket assembly includes a mounting base unit and a pair of connector members. The mounting base unit includes a base, a pair of lateral surfaces, and a pair of mounting surfaces. The pair of lateral surfaces are defined along a length of the mounting base unit. Each lateral surface defines a mounting slot to receive a securing unit to fixedly connect the mounting base unit to a drive unit of the conveyor system. The pair of mounting surfaces are defined along a width of the mounting base unit. Each mounting surface defines a connection slot to receive a connector member. The pair of connector members fixedly attach to the connection slot of each mounting surface of the mounting base unit to fixedly connect the mounting base unit to a support unit of the conveyor system.

19 Claims, 5 Drawing Sheets

(56) References Cited

U.S. PATENT DOCUMENTS

| | | | | |
|---|---|---|---|---|
| 7,954,777 B2* | 6/2011 | Bohm | ............... | H01Q 1/1221 |
| | | | | 403/57 |
| 8,020,824 B2* | 9/2011 | Pan | ............... | H01Q 1/1242 |
| | | | | 248/222.51 |
| 9,172,137 B2* | 10/2015 | Lee | ............... | H01Q 3/06 |
| RE47,497 E * | 7/2019 | Fackler | ............... | F16M 11/2014 |
| 10,549,916 B2* | 2/2020 | Pajevic | ............... | G05D 1/0227 |
| 10,608,316 B2* | 3/2020 | Moheb | ............... | F16M 11/10 |
| 10,899,551 B1* | 1/2021 | Fuller | ............... | B65G 21/10 |
| 2002/0084396 A1* | 7/2002 | Weaver | ............... | F16M 13/02 |
| | | | | 248/278.1 |
| 2005/0061635 A1 | 3/2005 | Woodward | | |
| 2005/0189196 A1* | 9/2005 | Chou | ............... | G06F 1/1616 |
| | | | | 198/300 |
| 2007/0177064 A1* | 8/2007 | Lin | ............... | H01Q 3/04 |
| | | | | 348/838 |
| 2010/0244406 A1* | 9/2010 | Hicks | ............... | B62D 21/11 |
| | | | | 280/433 |

* cited by examiner

ADJUSTABLE BRACKET ASSEMBLY

TECHNICAL FIELD

The present application relates generally, in some examples, to a bracket assembly. More specifically, the present application relates, in some examples, to a bracket for allowing adjustments to angular orientation of a gearbox attached to a conveyor system.

BACKGROUND

Gearboxes are often used to operate a conveyor. For example, a gearbox may be secured to a conveyor by a shaft. The inventors have identified numerous deficiencies and problems with the existing technologies in this field. For example, existing technologies may result in a gearbox not being level with the ground when a conveyor is inclined. This may result in a gearbox using an improper amount of oil, shortening its lifespan. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

Various embodiments illustrated herein disclose an adjustable bracket assembly for a conveyor system. The adjustable bracket assembly comprises a mounting base unit and a pair of connector members. The mounting base unit comprises a base, a pair of lateral surfaces, and a pair of mounting surfaces. The pair of lateral surfaces are defined along a length of the mounting base unit. Each lateral surface defines a mounting slot configured to receive a securing unit to fixedly connect the mounting base unit to a drive unit of the conveyor system. The pair of mounting surfaces are defined along a width of the mounting base unit. Each mounting surface defines a connection slot configured to receive a connector member. The pair of connector members are configured to fixedly attach to the connection slot of each mounting surface of the mounting base unit to fixedly connect the mounting base unit to a support unit of the conveyor system.

Various embodiments illustrated herein disclose an adjustable bracket assembly for a drive unit of a conveyor system. The adjustable bracket assembly comprises a mounting base unit, a pair of connector members, and a support unit configured to mount the adjustable bracket assembly. The mounting base unit comprises a base, a pair of lateral surfaces, and a pair of mounting surfaces. The pair of lateral surfaces are defined along a length of the mounting base unit. Each lateral surface defines a mounting slot configured to receive a securing unit to fixedly connect the mounting base unit to a drive unit of the conveyor system. The pair of mounting surfaces are defined along a width of the mounting base unit. Each mounting surface defines a connection slot configured to receive a connector member. The pair of connector members are configured to fixedly attach to the connection slot of each mounting surface of the mounting base unit to fixedly connect the mounting base unit to the support unit of the conveyor system. The support unit comprises a pair of wall surfaces. Each wall surface defines a mounting recess configured to operably receive the other end of each connector member to connect the support unit to the mounting base unit.

BRIEF DESCRIPTION OF THE DRAWINGS

Figure 1:
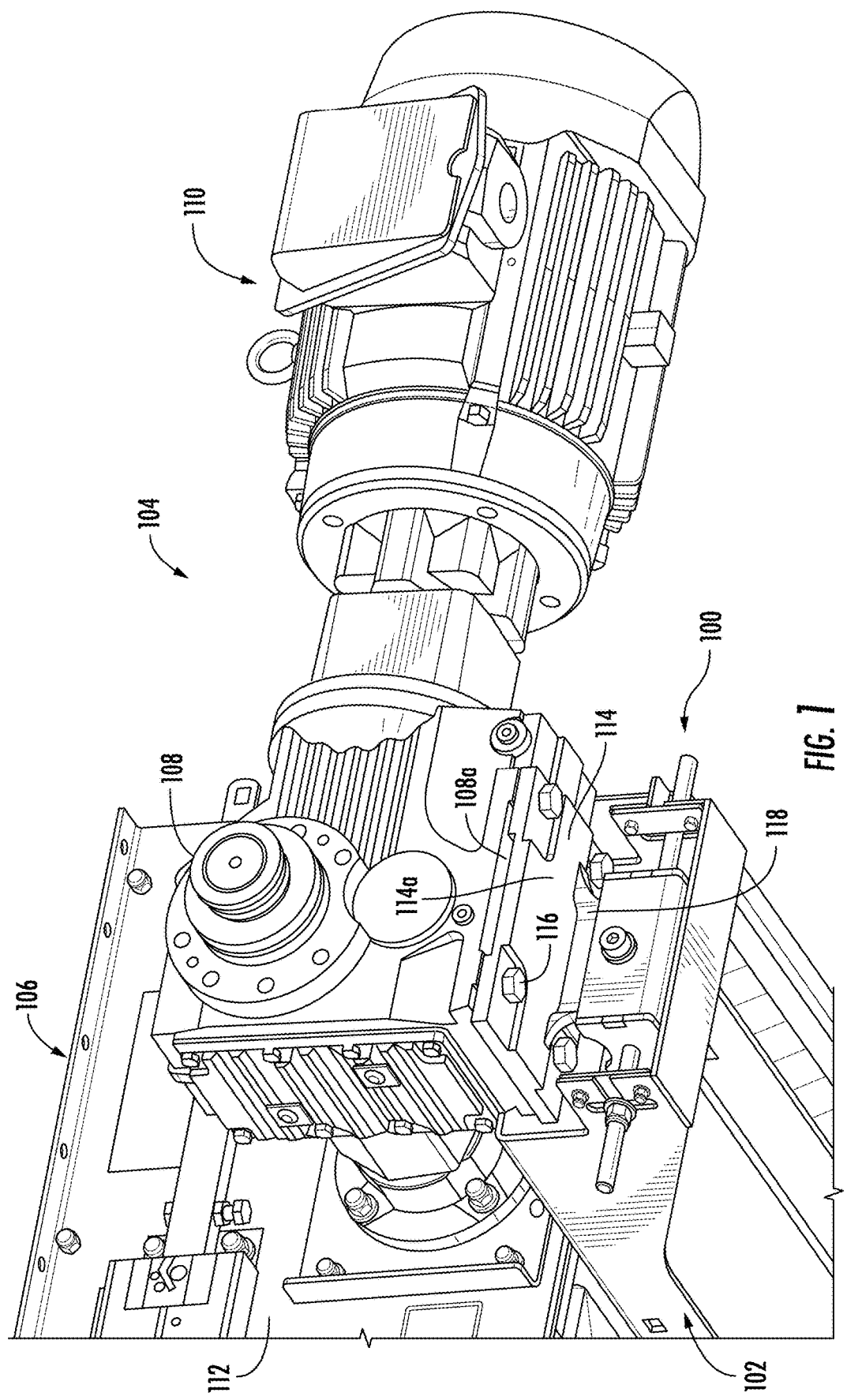

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 exemplarily illustrates a front perspective view of an adjustable bracket assembly mounted to a support unit and a drive unit of a conveyor system, according to one or more embodiments described herein.

Figure 2:
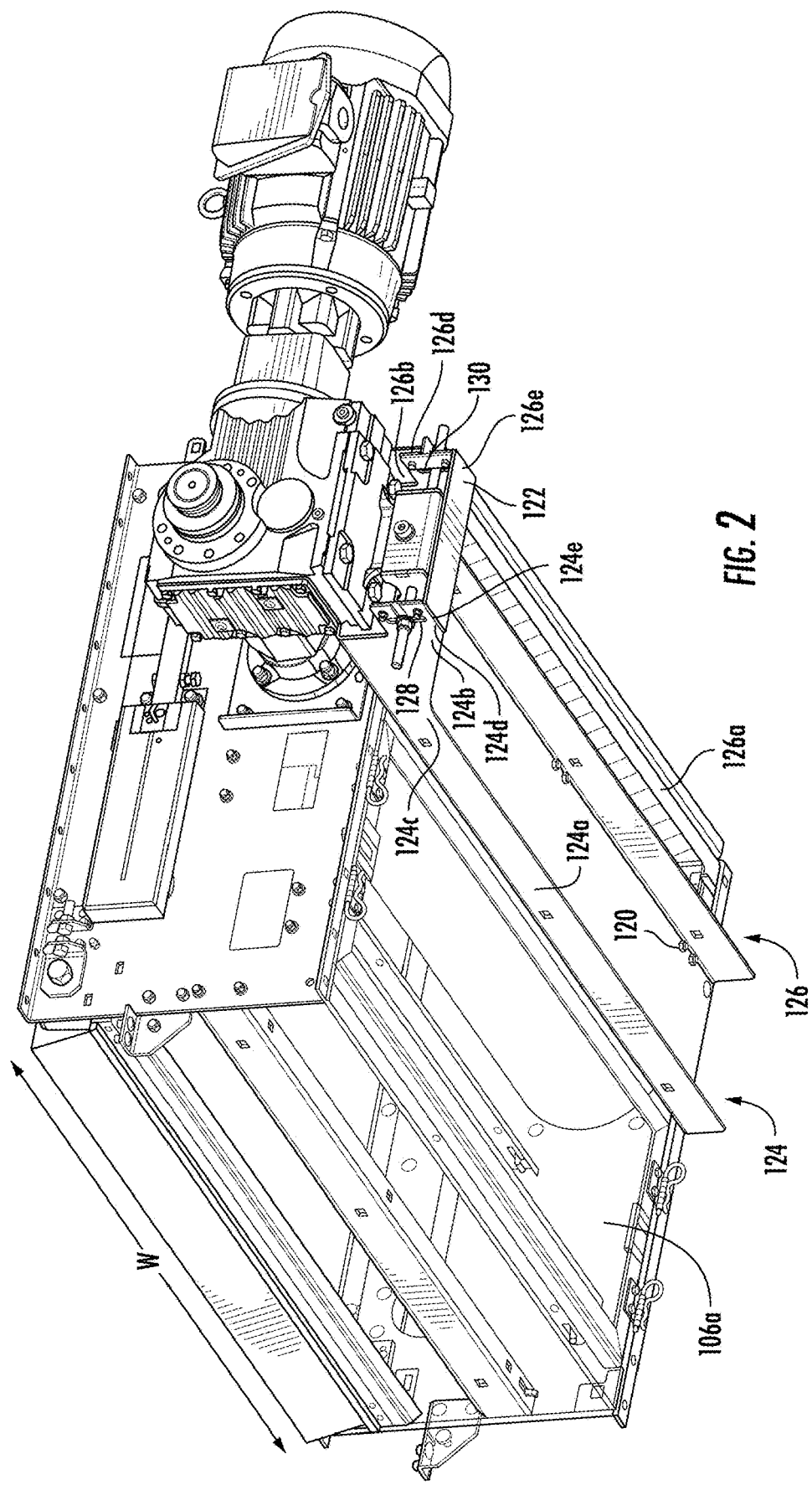

FIG. 2 exemplarily illustrates a bottom perspective view of the adjustable bracket assembly mounted to the support unit of the conveyor system, according to one or more embodiments described herein.

Figure 3:
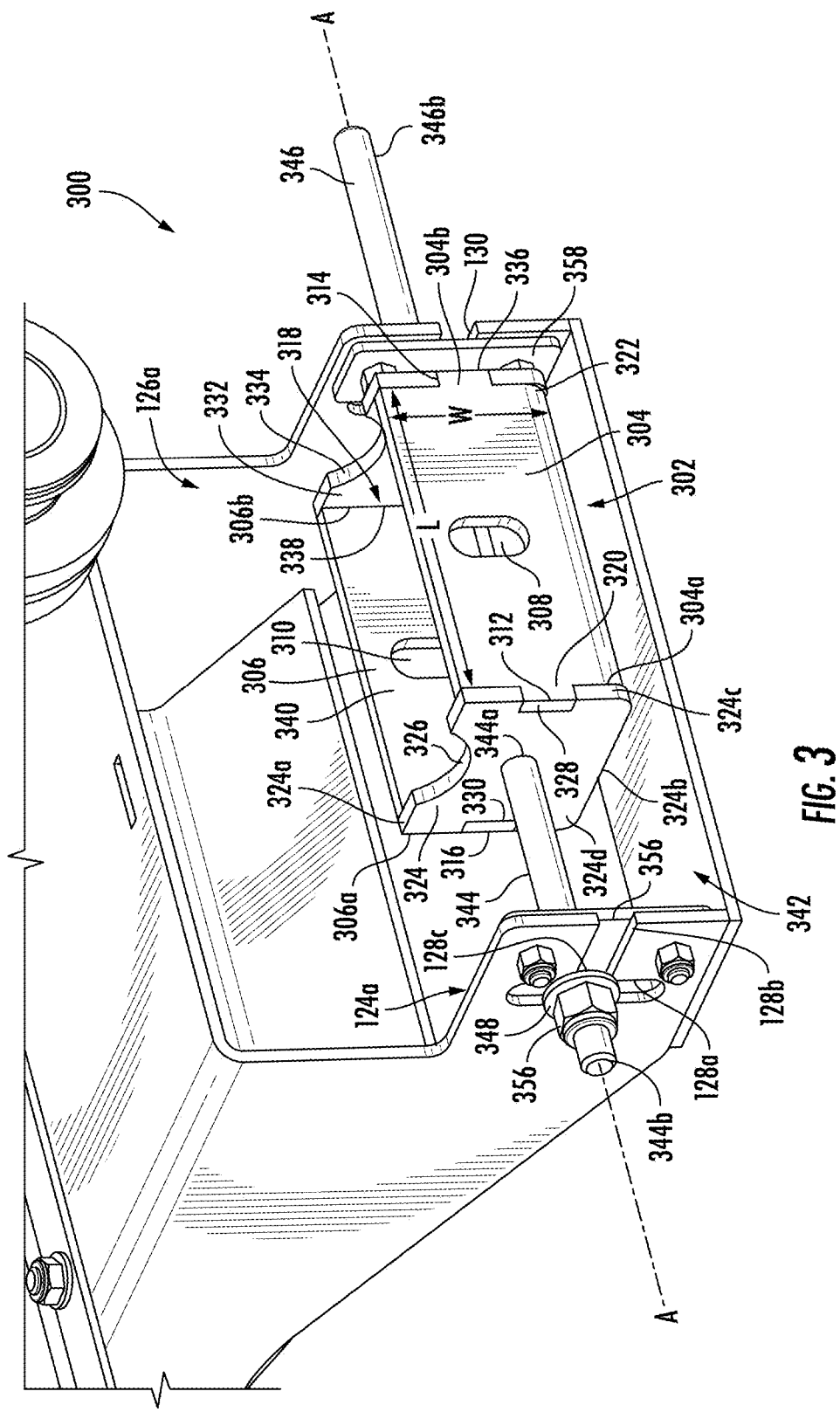

FIG. 3 exemplarily illustrates a top perspective view of the adjustable bracket assembly mounted to the support unit of the conveyor system, according to one or more embodiments described herein.

Figure 4:
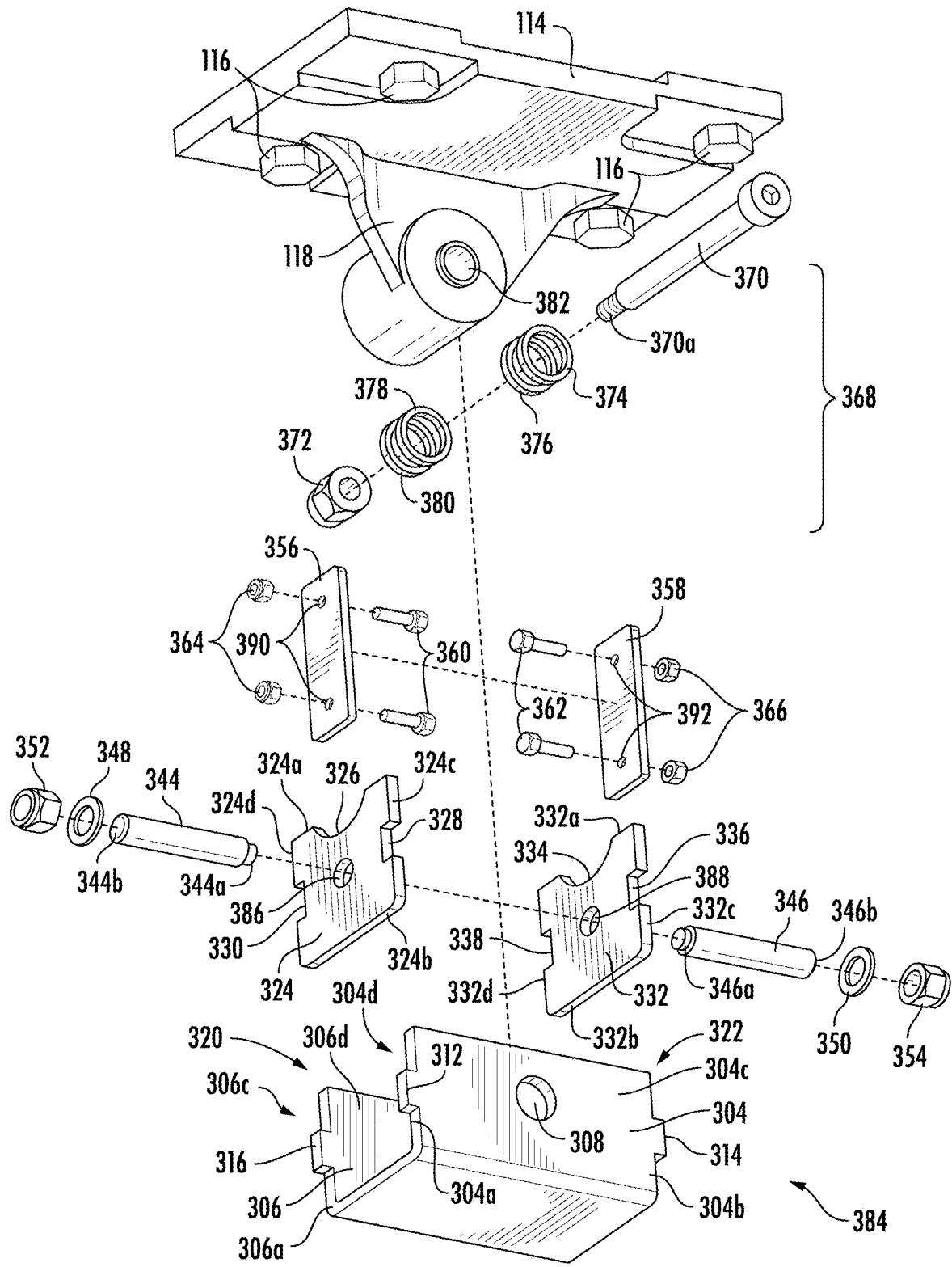

FIG. 4 exemplarily illustrates an exploded view of the adjustable bracket assembly, according to one or more embodiments described herein.

Figure 5A:
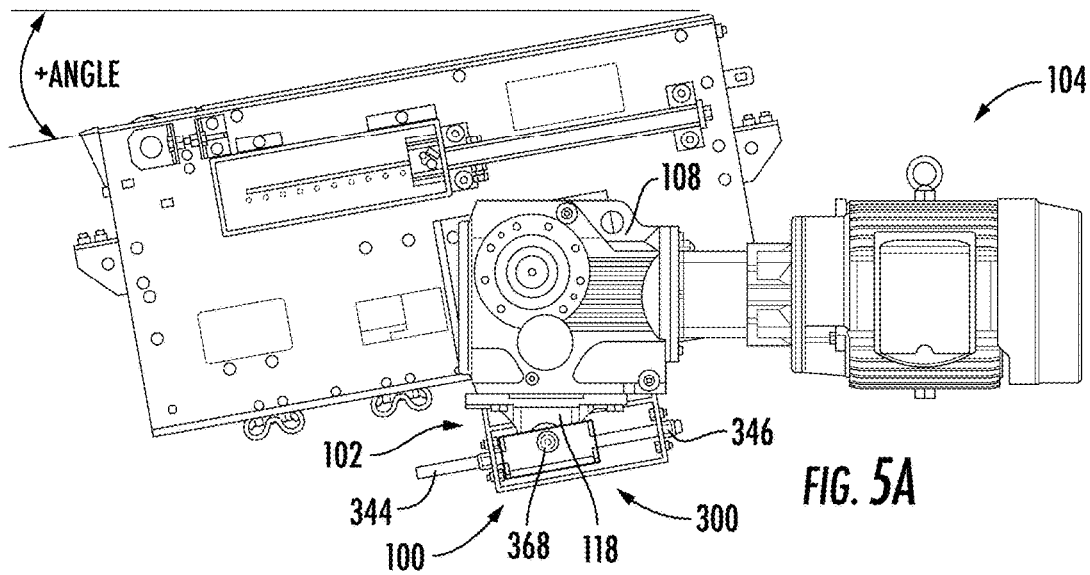
Figure 5B:
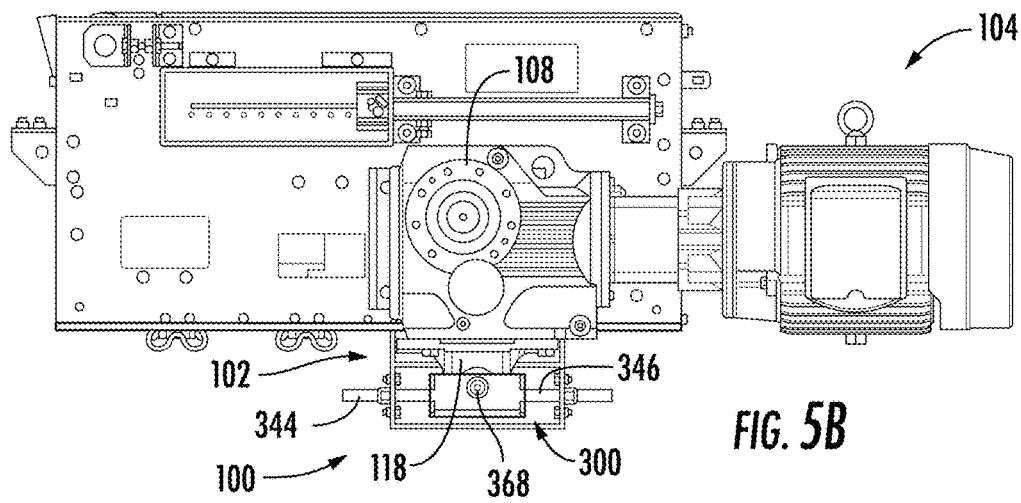
Figure 5C:
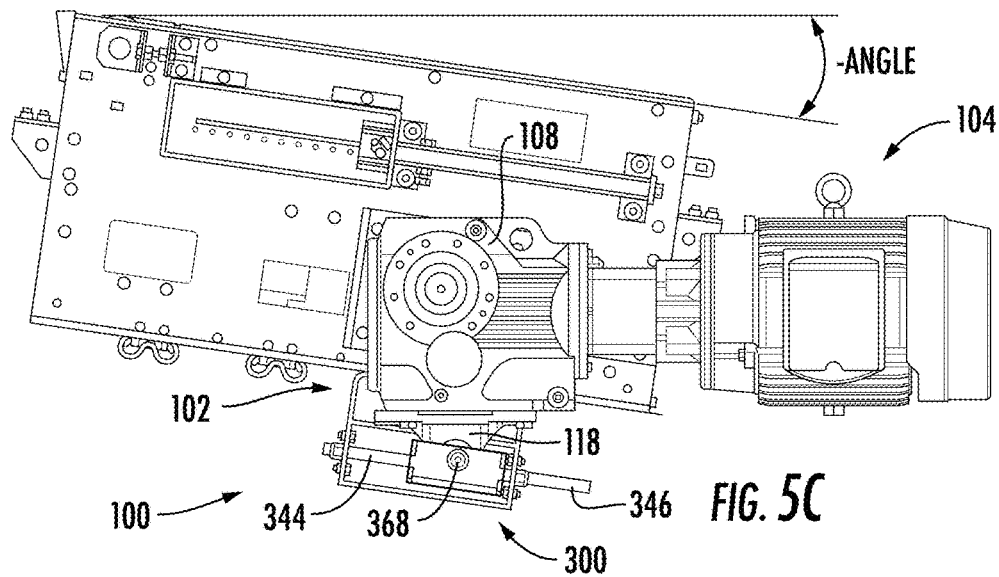

FIGS. 5A-5C exemplarily illustrate different orientations of the drive unit of the conveyor system achieved using the adjustable bracket assembly, according to one or more embodiments described herein.

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements.

As used herein, the term "exemplary" means serving as an example, instance, or illustration. Any aspect or design described herein as "exemplary" is not necessarily to be construed as preferred or advantageous over other aspects or designs. Rather, use of the word exemplary is intended to present concepts in a concrete fashion. In addition, while a particular feature may be disclosed with respect to only one of several implementations, such feature may be combined with one or more other features of the other implementations as may be desired and advantageous for any given or particular application. Unless the context requires otherwise, throughout the specification and claims which follow, the word "comprise" and variations thereof, such as, "comprises" and "comprising" are to be construed in an open sense, that is as "including, but not limited to." Furthermore, to the extent that the terms "includes" and "including" and variants thereof are used in either the detailed description or the claims, these terms are intended to be inclusive in a manner similar to the term "comprising."

As used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "coupled," "fixed," "attached to," and the like refer to both direct coupling, fixing, or attaching, as well as indirect coupling, fixing, or attaching through one or more intermediate components or features, unless otherwise specified herein. As used herein, coupling can be accomplished through for example, welding or bolting one component to another component.

As used herein, the term "positioned directly on" refers to a first component being positioned on a second component such that they make contact. Similarly, as used herein, the term "positioned directly between" refers to a first component being positioned between a second component and a third component such that the first component makes contact with both the second component and the third component. In contrast, a first component that is "positioned between" a second component and a third component may or may not have contact with the second component and the third component. Additionally, a first component that is "positioned between" a second component and a third component is positioned such that there may be other intervening components between the second component and the third component other than the first component.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

A gearbox or a speed reducer is used in a conveyor system to control the speed of a conveyor belt. Such gearbox is typically mounted to a side rail track of the conveyor system by using a standard bracket fixedly attached to the side rail track of the conveyor system. The standard bracket is configured to mount the gearbox oriented at an angle of about 90° or 180° with respect to the ground level, such that the recommended oil levels can be maintained with minimal variations, for example, of about ±3°. As used herein, the "ground level" refers to the horizontal axis. Sometimes, the conveyor system may be required to be installed at a specific inclination/declination, which results in a small angle variation from the standard horizontal orientation of the conveyor system. For example, this angle may range between ±18°. When the conveyor system has an incline or a decline, the orientation of the gearbox also changes. The gearbox operates with incorrect oil levels when the gearbox is not mounted at the required orientation, that is, horizontally or vertically. Such oblique orientation of the gearbox is detrimental to the expected lifespan of the gearbox. Further, manufacturing a different bracket for different orientations of the conveyor system requires a lot of part numbers, which increases the cost of such brackets.

The present disclosure addresses above problems associated with standard brackets used for mounting gearboxes to the conveyor systems by providing an adjustable bracket assembly that allows varying the angle of orientation of a gearbox with respect to the ground level, such that the gearbox is either horizontally or vertically aligned with respect to the ground level.

FIG. 1 exemplarily illustrate a front perspective view of an adjustable bracket assembly 100 mounted to a support unit 102 and a drive unit 104 of a conveyor system 106, according to one or more embodiments described herein.

A conveyor system 106 typically includes one or more drive unit 104 configured to control the speed of a conveyor belt (not shown). In an embodiment, the drive unit 104 comprises a gearbox 108 and a motor 110. The gearbox 108 is mounted on a shaft (not shown) of the conveyor system 106 that extends outwardly from a side-track rail 112 of the conveyor system 106. The gearbox 108 is configured as a speed reducer to control an amount of torque delivered to the shaft that drives the conveyor belt. The motor 110 is rotationally coupled to the gearbox 108 to drive the gearbox 108, thereby controlling the speed of the conveyor belt. The drive unit 104 further comprises an attachment bracket 114 fixedly attached to a bottom surface 108a of the gearbox 108. In an embodiment, the attachment bracket 114 is fixedly attached to the bottom surface 108a of the gearbox 108 via multiple fasteners 116, such as, bolts, nuts, washers, etc. In an embodiment, the attachment bracket 114 defines a torque arm 118 extending laterally from a central portion 114a of the attachment bracket 114. In an embodiment, the adjustable bracket assembly 100 is useful in case of a gearbox 108 with a long torque arm 118.

The torque arm 118 defines an aperture (exemplarily illustrated in FIG. 4) that allows the drive unit 104 to be fixedly connected to the adjustable bracket assembly 100. Hereinafter, the terms "gearbox 108" or "speed reducer" can be interchangeably used with the term "drive unit 104".

It is desirable, in some examples, for the drive unit 104 to be as level as possible with respect to the ground. Embodiments of the present disclosure include, but are not limited to, an adjustable bracket assembly 100 that, in some examples, allows the drive unit 104 (specifically, the gearbox 108) to adjust its angle with respect to the ground. The adjustable bracket assembly 100 is described in further detail in FIG. 3.

FIG. 2 exemplarily illustrates a bottom perspective view of the adjustable bracket assembly 100 mounted to the support unit 102 of the conveyor system 106, according to one or more embodiments described herein. In one or more embodiments, as exemplarily illustrated in FIG. 2, the support unit 102 is secured to the bottom surface 106a of the conveyor system 106. In an example embodiment, the support unit 102 is secured to a bottom cover panel of the conveyor system 106. In an embodiment, the support unit 102 is secured to the bottom surface 106a of the conveyor system 106 by using fasteners 120 such as, bolts, washers, nuts, etc. In one or more embodiments, the plurality of bolts, washers, and/or nuts are made of a hard material. For example, the plurality of bolts, washers, and/or nuts may be made of metal. In one or more alternative embodiments, the support unit 102 may be secured to the conveyor system 106 by other means such as welding. In one or more embodiments, support unit 102 is made of a hard material. For example, support unit 102 may be made of metal.

In one or more embodiments, the support unit 102 extends across a width of the conveyor system 106. For example, the support unit 102 may extend across the bottom surface 106a of the conveyor system 106 and below the shaft of the conveyor system 106. In an example embodiment, the support unit 102 may include a portion 124a and 126a flush with the bottom surface 106a of the conveyor system 106, two parallel wall surfaces 124 and 126 that are perpendicular to the bottom surface 106a of the conveyor system 106, and a platform 122 extending between the two parallel wall surfaces 124 and 126. The two parallel wall surfaces 124 and 126 comprise a first wall surface 124 and a second wall surface 126.

In one or more embodiments, the first wall surface 124 is perpendicular to the platform 122. For example, the first wall surface 124 may be parallel to the second wall surface 126. In some examples, the first wall surface 124 includes a first portion 124a extending underneath the bottom surface 106a of the conveyor system 106 and a second portion 124b extending under the shaft of the conveyor belt. In some examples, the first portion 124a of the first wall surface 124 and the second portion 124b of the first wall surface 124 are connected by a first transition portion 124c. For example, the first transition portion 124c may gradually increase in height as it gets closer to the second portion 124b. In some examples, the second portion 124b of the first wall surface 124 is greater in height than the first portion 124a of the first wall surface 124. In some examples, the first wall surface 124 includes a first rectangular protrusion 124d coupled to the platform 122 at a first point of contact 124e. As exemplarily illustrated in FIG. 2, the first rectangular protrusion 124d of the first wall surface 124 is proximal to the drive unit 104 of the conveyor system 106.

In one or more embodiments, the second wall surface 126 is perpendicular to the platform 122. For example, the second wall surface 126 may be parallel to the first wall surface 124. In some examples, the second wall surface 126 includes a first portion 126a extending underneath the bottom surface 106a of the conveyor system 106 and a second portion 126b extending under the shaft of the conveyor belt. In some examples, the first portion 126a of the second wall surface 126 and the second portion 126b of the second wall surface 126 are connected by a second transition portion (not shown). For example, the second transition portion may gradually increase in height as it gets closer to the second portion 126b. In some examples, the second portion 126b of the second wall surface 126 is greater in height than the first portion 126a of the second wall surface 126. In some examples, the second wall surface 126 includes a second rectangular protrusion 126d coupled to the platform 122 at a second point of contact 126e. As exemplarily illustrated in FIG. 2, the second rectangular protrusion 126d of the second wall surface 126 is proximal to the drive unit 104 of the conveyor system 106.

In an embodiment, each rectangular protrusion 124d and 126d defines a mounting recess 128 and 130 configured to operably receive at least one end of a connector member of the adjustable bracket assembly 100 (exemplarily illustrated and described in further detail in the description of FIG. 3), to connect the support unit 102 to the adjustable bracket assembly 100. In an example implementation, the mounting recess 128 and 130 is a T-shaped recess, as exemplarily illustrated in FIGS. 1-2. For example, the mounting recess 128 or 130 defines a lateral slot 128a (lateral slot of the mounting recess 130 is not shown) and a longitudinal slot 128b (longitudinal slot of the mounting recess 130 is not shown) meeting at a central T junction 128c (central T junction of the mounting recess 130 is not shown), where the longitudinal slot 128b allows insertion of the connection member of the adjustable bracket assembly 100 and the lateral slot 128a allows vertical movement of the connection member for adjustably changing the orientation of the drive unit 104 fixedly connected to the adjustable bracket assembly 100. For example, each of the lateral slots 128a (lateral slot of the mounting recess 130 is not shown) may define a length such that adjustable bracket assembly 100 may be secured to the support unit 102 at any position between the two parallel lateral wall surfaces 124 and 126 of the support unit 102 by sliding along the lateral slots 128a (lateral slot of the mounting recess 130 is not shown) prior to being fully secured to the support unit 102.

In an embodiment, the support unit 102 defines a plurality of slots (not shown) which may be used to secure the adjustable bracket assembly 100 to the support unit 102 with the help of fasteners 120, such as, bolts, nuts, washers, etc., as explained further in the description of FIG. 3. In one or more embodiments, the plurality of bolts, washers, and/or nuts are made of a hard material. For example, the plurality of bolts, washers, and/or nuts may be made of metal.

FIG. 3 exemplarily illustrates a top perspective view of the adjustable bracket assembly 100 mounted to the support unit 102 of the conveyor system 106, according to one or more embodiments described herein. As exemplarily illustrated in FIG. 3, the adjustable bracket assembly 100 comprises a mounting base unit 300 and a pair of connector members 344 and 346.

In an embodiment, the mounting base unit 300 comprises a base 302, a pair of lateral surfaces 304 and 306, and a pair of mounting surfaces 324 and 332. In an embodiment, the mounting base unit 300 may be of any shape and size, such that the mounting base unit 300 defines a cavity 340 capable of housing the torque arm 118 of the drive unit 104 of the conveyor system 106 and allowing angular rotation of the torque arm 118 within the cavity 340. In one or more embodiments, the mounting base unit 300 is made of a hard or semi-hard material. For example, the mounting base unit 300 may be made of metal (e.g., steel, aluminum, and/or the like), plastic, a composite material, and/or the like.

In an embodiment, the base 302, the pair of lateral surfaces 304 and 306, and the pair of mounting surfaces 324 and 332 define the cavity 340 of the mounting base unit 300. In an embodiment, dimensions of the mounting base unit 300 do not exceed dimensions of the support unit 102 defined by the rectangular protrusions 124d and 126d and the platform 122 of the support unit 102, such that the mounting base unit 300 is housed within a mounting space 342 of the support unit 102 defined by the rectangular protrusions 124d and 126d and the platform 122 of the support unit 102. For example, length, width, and height dimensions of the mounting base unit 300 do not exceed length, width, and height dimensions of the support unit 102 defining the mounting space 342. In this embodiment, the mounting base unit 300 is configured to traverse along the longitudinal axis A-A of the support unit 102 to allow adjustment of the orientation of the drive unit 104 of the conveyor system 106 fixedly connected to the mounting base unit 300.

In an embodiment, the base 302 may be of any shape and size. For example, the base 302 may be of rectangular shape, square shape, etc. In an embodiment, length and width dimensions of the base 302 does not exceed the length and width dimensions of the platform 122 of the support unit 102. In an example embodiment, the base 302 is of rectangular shape, as exemplarily illustrated in FIG. 3.

In an embodiment, the pair of lateral surfaces 304 and 306 comprise a first lateral surface 304 and a second lateral surface 306. The pair of lateral surfaces 304 and 306 are defined along the length L of the mounting base unit 300, as exemplarily illustrated in FIG. 3. In an embodiment, each lateral surface 304 and 306 defines a mounting slot 308 and 310 configured to receive a securing unit 368 (exemplarily illustrated in FIG. 4) to fixedly connect the mounting base unit 300 to the drive unit 104 of the conveyor system 106. In some examples, different sizes, orientations, and dispositions may be selected for the mounting slots 308 and 310. In example embodiments, different sizes, orientations, and dispositions of the mounting slots 308 and 310 may be selected based on a type or dimensions of the gearbox 108 of the drive unit 104 and/or the aperture 382 (exemplarily illustrated in FIG. 4) defined in the torque arm 118 of the attachment bracket 114 that is used to connect the gearbox 108 to the shaft of the conveyor belt. For example, the first lateral surface 304 defines a first mounting slot 308 and the second lateral surface 306 defines a second mounting slot 310. In an embodiment, the first mounting slot 308 and the second mounting slot 310 may be of any shape, for example, rectangular shape (as exemplarily illustrated in FIG. 3), circular shape (as exemplarily illustrated in FIG. 4), etc. In the embodiment exemplarily illustrated in FIG. 3, the shape of the mounting slots 308 and 310 is rectangular to allow adjustable vertical movement of the attached torque arm 118, before securing the drive unit 104 to the adjustable bracket assembly 100 at the adjusted angular orientation. In some examples, the first mounting slot 308 defined on the first mounting surface 324 is parallel with the corresponding second mounting slot 310 defined on the second mounting surface 332.

In an embodiment, each side edge 304*a*, 304*b*, 306*a*, 306*b* of the first and second lateral surfaces 304 and 306 defines a protrusion 312, 314, 316, 318. For example, the side edges 304*a*, 304*b* of the first lateral surface 304 define a first set of protrusions 312 and 314 and the side edges 306*a*, 306*b* of the second lateral surface 306 define a second set of protrusions 316 and 318, as exemplarily illustrated in FIGS. 3-4.

In an embodiment, the base 302 and the pair of lateral surfaces 304 and 306 are coupled together to define a U-shaped bracket 384 of the mounting base unit 300, as exemplarily illustrated in FIG. 4. In an example embodiment, the base 302 and the pair of lateral surfaces 304 and 306 are welded together to form the U-shaped bracket 384. In another embodiment, the coupling of the base 302 and the pair of lateral surfaces 304 and 306 to define the U-shaped bracket 384 is not limited to the process of welding and can be coupled together by using other attachment mechanisms known in the art, for example, bolts, nuts, washers, adhesives, etc. In one or more embodiments, the plurality of bolts, washers, and/or nuts are made of a hard material. For example, the plurality of bolts, washers, and/or nuts may be made of metal.

In an embodiment, the pair of mounting surfaces 324 and 332 comprise a first mounting surface 324 and a second mounting surface 332. The pair of mounting surfaces 324 and 332 are defined along a width W of the mounting base unit 300. In an embodiment, the first mounting surface 324 is attached to a first end 320 of the U-shaped bracket 384 and the second mounting surface 332 is attached to a second end 322 of the U-shaped bracket 384, where the first end 320 and the second end 322 are opposing ends of the U-shaped bracket 384.

In one or more embodiments, each of the first mounting surface 324 and the second mounting surface 332 define a top edge 324*a* and 332*a*, a bottom edge 324*b* and 332*b*, and side surfaces 324*c*, 324*d*, 332*c*, 332*d*. The bottom edge 324*b* and 332*b* and side surfaces 324*c*, 324*d*, 332*c*, 332*d* of each of the first mounting surface 324 and the second mounting surface 332 are coupled to the mounting base unit 300. For examples, the bottom edge 324*b* and the side surfaces 324*c*, 324*d* of the first mounting surface 324 are coupled to the first end 320 of the U-shaped bracket 384 and the bottom edge 332*b* and the side surfaces 332*c*, 332*d* of the second mounting surface 332 are coupled to the second end 322 of the U-shaped bracket 384. In an example, the bottom edges 324*b* and 332*b* and the side surfaces 324*c*, 324*d*, 332*c*, 332*d* may be coupled to mounting base unit 300 by welding, bolted joints, and/or the like.

In an embodiment, each mounting surface 324 and 332 defines a connection slot 386 or 388 configured to receive a connector member 344 and 346 of the adjustable bracket assembly 100. For example, the first mounting surface 324 defines a first connection slot 386 and the second mounting surface 332 defines a second mounting slot 388, as exemplarily illustrated in FIG. 4. In an example embodiment, the mounting slots 386 and 388 are of circular shape. In other embodiment, the shape of the mounting slots 386 and 388 is not limited to a circular shape and may comprise other shapes known in the art that is configured to receive a rod member.

In an embodiment, each side surface 324*c*, 324*d*, 332*c*, 332*d* of the pair mounting surfaces 324 and 332 defines an attachment slot 328, 330, 336, and 338. For example, the side surface 324*c*, 324*d* of the first mounting surface 324 define a first set of attachment slots 328 and 330 and the side surface 332*c*, 332*d* of the second mounting surface 332 define a second set of attachment slots 336 and 338, as exemplarily illustrated in FIGS. 3-4. In an embodiment, the protrusions 312, 314, 316, 318 of the pair of lateral surfaces 304 and 306 are configured to fixedly couple with the attachment slots 328, 330, 336, and 338 defined on each side surface 324*c*, 324*d*, 332*c*, 332*d* of each mounting surface 324 and 332. For example, the protrusion 312 of the first lateral surface 304 and the protrusion 316 of the second lateral surface 306 fixedly couple with the attachment slots 328, and 330 of the first mounting surface 324, respectively, and the protrusion 314 of the first lateral surface 304 and the protrusion 318 of the second lateral surface 306 fixedly couple with the attachment slots 336 and 338 of the second mounting surface 332, respectively, as exemplarily illustrated in FIGS. 3-4.

In an embodiment, each mounting surface 324 and 332 of the pair of mounting surfaces 324 and 332 defines a curved aperture 326 and 334 at a top edge 324*a* and 332*a* of each mounting surface 324 and 332. For example, the first mounting surface 324 defines a first curved aperture 326 at the top edge 324a of the first mounting surface 324 and the second mounting surface 332 defines a second curved aperture 334 at the top edge 332a of the second mounting surface 332. In an embodiment, the top edge 324a and 332a of each mounting surface 324 and 332 is proximal to the torque arm 118 of the drive unit 104 of the conveyor system 106. In an embodiment, the curved apertures 326 and 334 are configured to allow angular rotation of the torque arm 118 of the drive unit 104 with respect to the adjustable bracket assembly 100 for adjusting an orientation of the drive unit 104 with respect to the ground level. For example, the curved apertures 326 and 334 are semi-circular in shape, as exemplarily illustrated in FIGS. 3-4. However, the curved aperture 326 and 334 is not limited to being of semi-circular shape, and in other embodiments, may be defined of other shapes.

In an embodiment, the pair of connector members 344 and 346 comprise a first connector member 344 and a second connector member 346. In an embodiment, the connector members 344 and 346 are configured as threaded rods such that the length of the threaded rods comprise threaded portions (not shown). In an embodiment, the pair of connector members 344 and 346 are configured to fixedly attach to the connection slot 386 and 388 of each mounting surface 324 and 332 of the mounting base unit 300 to fixedly connect the mounting base unit 300 to the support unit 102 of the conveyor system 106. For example, a first end 344a of the first connector member 344 is fixedly attached to the first connection slot 386 of the first mounting surface 324 and a first end 346a of the second connector member 346 is connected to the second connection slot 388 of the second mounting surface 332, as exemplarily illustrated in FIGS. 3-4. In an embodiment, the first end 344a of the first connector member 344 is threaded into to the first connection slot 386 of the first mounting surface 324 and the first end 346a of the second connector member 346 is threaded into the second connection slot 388 of the second mounting surface 332. In other embodiments, the fixed attachment of the first ends 344a and 346a of the connector members 344 and 346 to the respective connection slots 386 and 388 is not limited to being threaded but may also comprise welding the first ends 344a and 346a of the connector members 344 and 346 to the respective connection slots 386 and 388 of the mounting surfaces 324 and 332.

In an embodiment, a second end 344b of the first connector member 344 is configured to extend through the first mounting recess 128 defined in the first wall surface 124 of the support unit 102 of the conveyor system 106 and a second end 346b of the second connector member 346 is configured to extend through the second mounting recess 130 defined in the second wall surface 126 of the support unit 102 of the conveyor system 106, as exemplarily illustrated in FIG. 3. In an embodiment, the second end 344b of the first connector member 344 and the second end 346b of the second connector member 346 are configured as threaded ends such that the second ends 344b and 346b may receive washers 348 and 350 and nuts 352 and 354 to secure the adjustable bracket assembly 100 to the support unit 102 of the conveyor system 106. For example, the second end 344b of the first connector member 344 is extended through the first mounting recess 128 defined in the first wall surface 124 of the support unit 102 and secured to the first wall surface 124 of the support unit 102 by using a washer 348 and a nut 352 on the first wall surface 124. In an example embodiment, the nut 352 may be a self-lock nut 352, as exemplarily illustrated in FIGS. 3-4. Similarly, the second end 346b of the second connector member 346 is extended through the second mounting recess 130 defined in the second wall surface 126 of the support unit 102 and secured to the second wall surface 126 of the support unit 102 by using a washer 350 and a nut 354 on the second wall surface 126. In an example embodiment, the nut 354 may be a self-lock nut 354, as exemplarily illustrated in FIGS. 3-4. Although, FIGS. 3-4 depict the nuts 352 and 354 as a self-lock nut, the scope of the invention is not limited to the nuts 352 and 354 being a self-lock nut and may comprise other nuts known in the art.

In an embodiment, the mounting base unit 300 is positioned in the mounting space 342 defined by the support unit 102 by inserting the first connector member 344 through the longitudinal slot 128b of the first mounting recess 128 of the first wall surface 124 of the support unit 102 and inserting the second connector member 346 through the longitudinal slot (not shown) of the second mounting recess 130 of the second wall surface 126 of the support unit 102. In an embodiment, the position of the mounting base unit 300 is adjusted in the mounting space 342 to achieve the desired orientation of the drive unit 104 fixedly connected to the lateral surfaces 304 and 306 of the mounting base unit 300 by vertically sliding the adjustable bracket assembly 100 such that the first connector member 344 slides in the lateral slot 128a of the first mounting recess 128 of the first wall surface 124 of the support unit 102 and the second connector member 346 slides in the lateral slot (not shown) of the second mounting recess 130 of the second wall surface 126 of the support unit 102. Once the desired orientation of the drive unit 104 is achieved, the adjustable bracket assembly 100 is locked in position by securing the second ends 344b and 346b of the connector members 344 and 346 to the wall surfaces 124 and 126 of the support unit 102 by using the nuts 352 and 354 and the washers 348 and 350.

In an embodiment, the adjustable bracket assembly 100 further comprises a pair of attachment plates 356 and 358 operably attached to the wall surfaces 124 and 126 of the support unit 102 of the conveyor system 106 to securely mount the adjustable bracket assembly 100 to the support unit 102 of the conveyor system 106. In an embodiment, the pair of attachment plates 356 and 358 comprises a first attachment plate 356 and a second attachment plate 358. In an example embodiment, the attachment plates 356 and 358 are rectangular in shape configured to partially cover a portion of the mounting recess 128 and 130 defined in the first wall surface 124 and the second wall surface 126 of the support unit 102 after a respective second end 344b and 346b of each of the first connector member 344 and the second connector member 346 extends through the respective mounting recess 128 and 130, as exemplarily illustrated in FIG. 3. In an embodiment, the attachment plates 356 and 358 are secured to inner surfaces 124a and 126a of the wall surfaces 124 and 126 after the respective second end 344b and 346b of each of the first connector member 344 and the second connector member 346 is inserted through the longitudinal slots 128b (longitudinal slot of the mounting recess 130 is not shown) of the mounting recesses 128 and 130 and positioned in the lateral slots 128a (lateral slot of the mounting recess 130 is not shown) of the mounting recesses 128 and 130 to achieve the desired orientation of the drive unit 104 of the conveyor system 106. In an embodiment, the attachment plates 356 and 358 are used to ensure that the first connector member 344 and the second connector member 346 do not slip out or displace through the longitudinal slots 128b (longitudinal slot of the mounting recess 130 is not shown) of the mounting recesses 128 and 130. In an embodiment, the attachment plates 356 and 358 also provide more stiffness and sturdiness to the adjustable bracket assembly 100.

In an embodiment, the attachment plates 356 and 358 define a plurality of openings 390 and 392 (exemplarily illustrated in FIG. 4) to receive securing elements that secure the attachment plates 356 and 358 to the support unit 102 of the conveyor system 106. In an example embodiment, the attachment plates 356 and 358 are secured to the inner surfaces 124a and 126a of the wall surfaces 124 and 126 by using securing elements such as, bolts 360 and 362, nuts 364 and 366, and washers (not shown) that pass through the openings 390 and 392 of the attachment plates 356 and 358, as exemplarily illustrated in FIGS. 3-4. In one or more embodiments, the plurality of bolts 360 and 362, washers, and/or nuts 364 and 366 are made of a hard material. For example, the plurality of bolts 360 and 362, washers, and/or nuts 364 and 366 may be made of metal.

The scope of the invention is not limited to the adjustable bracket assembly 100 comprising the mounting base unit 300 and the pair of connector members 344 and 346. In other embodiments, the adjustable bracket assembly 100 also comprises the support unit 102 along with the mounting base unit 300 and the pair of connector members 344 and 346.

In an embodiment, a method of mounting the adjustable bracket assembly 100 onto the support unit 102 of the conveyor system 106 is disclosed herein. The first connector member 344 and the second connector member 346 of the adjustable bracket assembly 100 are inserted through the two longitudinal slots 128b (longitudinal slot of the mounting recess 130 is not shown) of respective mounting recesses 128 and 130 defined in the first wall surface 124 and the second wall surface 126 of the support unit 102. The first connector member 344 and the second connector member 346 are then positioned in the lateral slots 128a (lateral slot of the mounting recess 130 is not shown) of respective mounting recesses 128 and 130 at any position in the lateral slots 128a (lateral slot of the mounting recess 130 is not shown). The second ends 344b and 346b of the first connector member 344 and the second connector member 346 are secured to the first wall surface 124 and the second wall surface 126 by tightening the washers 348 and 350 and the nuts 352 and 354. Then the attachment plates 356 and 358 are installed using bolts 360 and 362, nuts 352 and 354, and washers 348 and 350 on each side to close the longitudinal slots 128b (longitudinal slot of the mounting recess 130 is not shown) of the mounting recesses 128 and 130, thereby preventing the adjustable bracket assembly 100 from slipping out of the mounting recesses 128 and 130 of the support unit 102.

The drive unit 104 comprising the gearbox 108, the motor 110, and the attachment bracket 114 comprising the torque arm 118 are assembled and installed in the conveyor system 106 as per established installation procedures. Once the drive unit 104 is installed, the nuts 352 and 354 and the washers 348 and 350 can be partially unfastened to reposition the adjustable bracket assembly 100 by moving the connector members 344 and 346 up, down, left, or right until the torque arm 118 of the drive unit 104 fits into the cavity 340 defined by the mounting base unit 300. The mounting slots 308 and 310 of the pair of lateral surfaces 304 and 306 is aligned with the aperture 382 in the torque arm 118 and the at least one bolt 370 of the securing unit 368 is inserted into through the mounting slots 308 and 310 and the aperture 382. For adjusting the orientation of the drive unit 104, the threaded portion of the first connector member 344 is threaded while the threaded portion of the second connector member 346 is unthreaded, or vice versa. Once the desired orientation of the drive unit 104 is achieved, the nuts 352 and 354 are fastened to secure the drive unit 104 in the desired orientation.

FIG. 4 exemplarily illustrates an exploded view of the adjustable bracket assembly 100, according to one or more embodiments described herein. As exemplarily illustrated in FIG. 4, the mounting base unit 300 comprises the U-shaped bracket 384 with the mounting slots 308 and 310 defined in the lateral surfaces 304 and 306 of the mounting base unit 300, and the pair of mounting surfaces 324 and 332 defining the connection slots 386 and 388. The threaded portion at the first end 344a and 346a of the connector members 344 and 346 is configured to be fixedly attached to the connection slots 386 and 388 of the mounting surfaces 324 and 332. The nuts 352 and 354 and the washers 348 and 350 are provided at the second ends 344b and 346b of the connector members 344 and 346 to secure the attachment bracket 114 assembly to the support unit 102 of the conveyor system 106 (exemplarily illustrated in FIGS. 1-3).

In an embodiment, the securing unit 368 received in the mounting slots 386 and 388 of the pair of lateral surfaces 304 and 306 comprises at least one bolt 370. The at least one bolt 370 is configured to extend through the mounting slot 386 and 388 of each lateral surface 304 and 306, as exemplarily illustrated in FIGS. 1-2. Further, the at least one bolt 370 is configured to extend through the mounting slot 386 and 388 of each lateral surface of the mounting base unit 300 and the aperture 382 defined in the torque arm 118 of the drive unit 104 of the conveyor system 106 to secure the drive unit 104 to the adjustable bracket assembly 100, as exemplarily illustrated in FIGS. 1-2 and 4.

In an embodiment, the securing unit 368 further comprises one or more washers 374, 376, 378, and 380 and one or more nuts 372 configured to secure the at least one bolt 370 to the pair of lateral surfaces 304 and 306 of the mounting base unit 300. For example, washers 374 and 380 are positioned on outer surfaces 304c and 306c of the first lateral surface 304 and the second lateral surface 306 and washers 376 and 378 are positioned on inner surfaces 304d and 306d of the first lateral surface 304 and the second lateral surface 306. In an example embodiment, the washers 374, 376, 378, and 380 are positioned on the inner surfaces 304d and 306d and the outer surfaces 304c and 306c of the first lateral surface 304 and the second lateral surface 306, and then the at least one bolt 370 is inserted through the first mounting slot 386, the aperture 382 of the torque arm 118 of the drive unit 104, and the second mounting slot 388 of the first lateral surface 304 and the second lateral surface 306, respectively. The at least one bolt 370 is secured in position by using a nut 372 that is positioned proximal to the second lateral surface 306.

In an example embodiment, the nut 372 comprises a self-lock nut. For example, the self-lock nut 372 may be threaded onto the end 370a of the at least one bolt 370, which is also threaded to receive the self-lock nut 372, as exemplarily illustrated in FIG. 4. In other embodiments, the nut 372 is not limited to a self-lock nut, and may comprise other fastening nuts known in the art. Although, FIG. 4 depicts that the at least one bolt 370 is inserted through the first mounting slot 386 of the first lateral surface 304, the insertion method of the at least one bolt 370 is not limited to this embodiment. In other embodiments, the at least one bolt 370 may be inserted through the second mounting slot 388 of the second lateral surface 306 and emerge out of the first mounting slot 386 of the first lateral surface 304, such that the nut 372 is positioned proximal to the first lateral surface 304 (not shown in figures).

The protrusions 312, 314, 316, 318 on the side edges 304a, 304b, 306a, 306b of the lateral surfaces 304 and 306 mate with the attachment slots 328, 330, 336, and 338 on the side surfaces 324c, 324d, 332c, 332d of the mounting surfaces 324 and 332 to fixedly couple the lateral surfaces 304 and 306 and the mounting surfaces 324 and 332 to form the mounting base unit 300. After fixedly coupling the lateral surfaces 304 and 306 and the mounting surfaces 324 and 332, the side edges 304a, 304b, 306a, 306b and the side surfaces 324c, 324d, 332c, 332d may be welded together to form the mounting base unit 300.

Further, FIG. 4 exemplarily illustrates the attachment plates 356 and 358 that are configured to be attached to the wall surfaces 124 and 126 of the support unit 102 with the bolts, the nuts 364 and 366, and the washers (not shown).

FIGS. 5A-5C exemplarily illustrate different orientations of the drive unit 104 of the conveyor system 106 achieved using the adjustable bracket assembly 100, according to one or more embodiments described herein. FIG. 5B exemplarily illustrates the conveyor system 106 aligned with the ground level and the adjustable bracket assembly 100 in the default position in which angular rotation of the drive unit 104 is not required. In FIG. 5A, the conveyor system 106 is inclined at an angle with respect to the ground level. The drive unit 104 is angularly rotated by using the adjustable bracket assembly 100 to maintain the orientation of the drive unit 104 aligned with the ground level. Similarly, when the conveyor system 106 is declined at an angle with respect to the ground level, the drive unit 104 is angularly rotated by using the adjustable bracket assembly 100 to maintain the orientation of the drive unit 104 aligned with the ground level, as exemplarily illustrated in FIG. 5C.

In one or more embodiments, the adjustable bracket assembly 100 is configured to allow the drive unit 104 to be level with the ground or to be angled at least within 3 degrees with the ground. For example, the combination of securing the drive unit 104 to the mounting slots 308 and 310 of the mounting base unit 300 of the adjustable bracket assembly 100 and sliding the adjustable bracket assembly 100 along the mounting recess 128 and 130 of the wall surfaces 124 and 126 of the support unit 102, allows the drive unit 104 to maintain a level position when the conveyor system 106 is angled away from the ground. For example, the adjustable bracket assembly 100 may allow the drive to maintain a level position when the conveyor system 106 is angled up to +/- angle, for example, 18 degrees from the ground. In example embodiments, this allows for a longer lifespan for the gearbox 108 of the drive unit 104 as the gearbox 108 can operate with proper oil levels.

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An adjustable bracket assembly for a conveyor system, the adjustable bracket assembly comprising:
    a mounting base unit comprising:
        a base;
        a pair of lateral surfaces defined along a length of the mounting base unit, wherein each lateral surface defines a mounting slot configured to receive a securing unit to fixedly connect the mounting base unit to a drive unit of the conveyor system; and
        a pair of mounting surfaces defined along a width of the mounting base unit, wherein each mounting surface defines a connection slot configured to receive a connector member,
        wherein each side edge of each mounting surface of the pair of mounting surfaces defines an attachment slot, and
        wherein each side edge of each lateral surface of the pair of lateral surfaces defines a protrusion configured to fixedly couple with the attachment slot defined on each side edge of each mounting surface; and
    a pair of connector members configured to fixedly attach to the connection slot of each mounting surface of the mounting base unit to fixedly connect the mounting base unit to a support unit of the conveyor system.

2. The adjustable bracket assembly of claim 1, wherein the base and the pair of lateral surfaces are coupled together to define a U-shaped bracket of the mounting base unit.

3. The adjustable bracket assembly of claim 2, wherein the pair of mounting surfaces comprises:
    a first mounting surface defining a first connection slot, wherein the first mounting surface is attached to a first end of the U-shaped bracket; and
    a second mounting surface defining a second connection slot, wherein the second mounting surface is attached to a second end of the U-shaped bracket, and wherein the first end and the second end are opposing ends of the U-shaped bracket.

4. The adjustable bracket assembly of claim 1, wherein the pair of connector members comprises:
    a first connector member, wherein a first end of the first connector member is fixedly attached to a first connection slot of a first mounting surface, and a second end of the first connector member is configured to extend through a first mounting recess defined in a first wall surface of the support unit of the conveyor system; and
    a second connector member, wherein a first end of the second connector member is connected to a second connection slot of a second mounting surface, and a second end of the second connector member is configured to extend through a second mounting recess defined in a second wall surface of the support unit of the conveyor system.

5. The adjustable bracket assembly of claim 4, further comprising a pair of attachment plates operably attached to a pair of wall surfaces of the support unit of the conveyor system to securely mount the adjustable bracket assembly to the support unit of the conveyor system, wherein each attachment plate is configured to partially cover a respective mounting recess defined in a respective wall surface of the support unit after a respective second end of each of the first connector member and the second connector member extends through the respective mounting recess.

6. The adjustable bracket assembly of claim 5, wherein the attachment plate defines a plurality of openings to receive securing elements that secure the attachment plate to the support unit of the conveyor system.

7. The adjustable bracket assembly of claim 1, wherein the securing unit comprises at least one bolt, and wherein the at least one bolt is configured to extend through the mounting slot of each lateral surface of the mounting base unit.

8. The adjustable bracket assembly of claim 7, wherein the at least one bolt is configured to extend through the mounting slot of each lateral surface of the mounting base unit and an aperture defined in a torque arm of the drive unit of the conveyor system to secure the drive unit to the adjustable bracket assembly.

9. The adjustable bracket assembly of claim 1, wherein each mounting surface of the pair of mounting surfaces defines a curved aperture at a top edge of each mounting surface, wherein the top edge of each mounting surface is proximal to a torque arm of the drive unit of the conveyor system, and wherein the curved aperture is configured to allow angular rotation of the torque arm of the drive unit with respect to the adjustable bracket assembly for adjusting an orientation of the drive unit with respect to a ground level.

10. An adjustable bracket assembly for a drive unit of a conveyor system, the adjustable bracket assembly comprising:
a mounting base unit comprising:
a base;
a pair of lateral surfaces defined along a length of the mounting base unit, wherein each lateral surface defines a mounting slot configured to receive a securing unit to fixedly connect the mounting base unit to the drive unit of the conveyor system; and
a pair of mounting surfaces defined along a width of the mounting base unit, wherein each mounting surface defines a connection slot configured to receive a connector member;
a pair of connector members, wherein at least one end of each connector member is configured to fixedly attach to the connection slot of each mounting surface of the mounting base unit; and
a of the conveyor system configured to mount the adjustable bracket assembly, wherein the support unit comprises a pair of wall surfaces, wherein each wall surface defines a mounting recess configured to operably receive the other end of each connector member to connect the support unit to the mounting base unit.

11. The adjustable bracket assembly of claim 10, wherein the base and the pair of lateral surfaces are coupled together to define a U-shaped bracket of the mounting base unit.

12. The adjustable bracket assembly of claim 11, wherein the pair of mounting surfaces comprises:

a first mounting surface defining a first connection slot, wherein the first mounting surface is attached to a first end of the U-shaped bracket; and
a second mounting surface defining a second connection slot, wherein the second mounting surface is attached to a second end of the U-shaped bracket, and wherein the first end and the second end are opposing ends of the U-shaped bracket.

13. The adjustable bracket assembly of claim 10, wherein the pair of connector members comprises:
a first connector member, wherein a first end of the first connector member is fixedly attached to a first connection slot of a first mounting surface, and a second end of the first connector member is configured to extend through a first mounting recess defined in a first wall surface of the support unit of the conveyor system; and
a second connector member, wherein a first end of the second connector member is connected to a second connection slot of a second mounting surface, and a second end of the second connector member is configured to extend through a second mounting recess defined in a second wall surface of the support unit of the conveyor system.

14. The adjustable bracket assembly of claim 13, further comprising a pair of attachment plates operably attached to the pair of wall surfaces of the support unit to securely mount the adjustable bracket assembly to the support unit, wherein each attachment plate is configured to partially cover a respective mounting recess defined in a respective wall surface of the support unit after a respective second end of each of the first connector member and the second connector member extends through the respective mounting recess.

15. The adjustable bracket assembly of claim 14, wherein the attachment plate defines a plurality of openings to receive securing elements that secure the attachment plate to the support unit.

16. The adjustable bracket assembly of claim 10, wherein the securing unit comprises at least one bolt, and wherein the at least one bolt is configured to extend through the mounting slot of each lateral surface of the mounting base unit.

17. The adjustable bracket assembly of claim 16, wherein the at least one bolt is configured to extend through the mounting slot of each lateral surface of the mounting base unit and an aperture defined in a torque arm of the drive unit of the conveyor system to secure the drive unit to the adjustable bracket assembly.

18. The adjustable bracket assembly of claim 10, wherein each mounting surface of the pair of mounting surfaces defines a curved aperture at a top edge of each mounting surface, wherein the top edge of each mounting surface is proximal to a torque arm of the drive unit of the conveyor system, and wherein the curved aperture is configured to allow angular rotation of the torque arm of the drive unit with respect to the adjustable bracket assembly for adjusting an orientation of the drive unit with respect to a ground level.

19. The adjustable bracket assembly of claim 10, wherein:
each side edge of each mounting surface of the pair of mounting surfaces defines an attachment slot; and
each side edge of each lateral surface of the pair of lateral surfaces defines a protrusion configured to fixedly couple with the attachment slot defined on each side edge of each mounting surface.

* * * * *